(12) United States Patent
Cartwright

(10) Patent No.: US 11,905,064 B2
(45) Date of Patent: Feb. 20, 2024

(54) LABELLING APPARATUS CONTROL

(71) Applicant: ILLINOIS TOOL WORKS INC., Glenview, IL (US)

(72) Inventor: Kevin Cartwright, Halesowen (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 62 days.

(21) Appl. No.: 17/583,360

(22) Filed: Jan. 25, 2022

(65) Prior Publication Data

US 2022/0234778 A1    Jul. 28, 2022

(30) Foreign Application Priority Data

Jan. 27, 2021    (GB) ..................... 2101109
Jan. 14, 2022    (GB) ..................... 2200458

(51) Int. Cl.
*B32B 41/00*    (2006.01)
*B65C 9/40*    (2006.01)

(52) U.S. Cl.
CPC .......... *B65C 9/40* (2013.01); *B65C 2009/408* (2013.01)

(58) Field of Classification Search
CPC ........ B65C 9/40; B65C 2009/408; B65C 9/46
USPC .................... 156/60, 64, 350, 351, 378, 379
See application file for complete search history.

(56) References Cited

U.S. PATENT DOCUMENTS

2006/0016867 A1*    1/2006  Tani ................. G06Q 10/08
                                                            235/375

FOREIGN PATENT DOCUMENTS

DE    102010038023          4/2012
JP    2015168129 A          9/2015
JP    2018047916 A          3/2018

* cited by examiner

*Primary Examiner* — Michael N Orlando
*Assistant Examiner* — Joshel Rivera
(74) *Attorney, Agent, or Firm* — THOMPSON HINE LLP

(57) ABSTRACT

A control module for a labelling apparatus, including: an input configured to receive a label generation request indicating a food item to be labelled; an output configured to provide a print signal to a label printing device; and a processor configured to: identify a set of ingredients of the indicated food item in response to receipt of the label generation request; and verify that the identified set of ingredients of the food item is a most recent set of ingredients of the food item. If the identified set of ingredients of the food item is verified as the most recent, the print signal is output to cause the label printing device to print an information label indicating the set of ingredients of the food item. If the identified set of ingredients cannot be verified as the most recent set of ingredients, provision of the print signal is prevented.

20 Claims, 7 Drawing Sheets

LABELLING APPARATUS CONTROL

TECHNICAL FIELD

The present disclosure relates to controlling a labelling apparatus, and to information management, for example relating to controlling a food labelling apparatus to generate labels showing correct, or up to date, information. Some examples disclosed herein relate to verifying that ingredient information for a food item to be labelled is up to date and/or complete.

INTRODUCTION

Supermarkets and high street shops are more frequently offering food for sale to consumers. However, a large number of the general public, and therefore a large number of consumers, suffer from allergies with regards to some specific, commonplace ingredients. A consumer may be allergic to, for example, milk, egg, peanut, tree nut, soy, fish, or shellfish, to name a few. Therefore, food vendors must list ingredients on the labelling of food items for sale in order for consumers with allergies to check whether a particular allergen may be included in a food item and whether the food item may be safely consumed.

However, ingredient labels for food items may omit ingredients. For example, a food item's recipe may be updated, and ingredients which may be allergens to some potential consumers may be introduced to the food item (for example, a new type of sauce used in a sandwich may contain milk, whereas there was no milk ingredient present in an old recipe). However, there may be a delay in updating the data used by the labelling device used to print a label for the food item. In such an example, the food item may be incorrectly labelled with an out-of-date ingredient list. A consumer, allergic to milk, may purchase the sandwich believing from the listed ingredients on the sandwich label that it is safe for them to consume, but the milk present in the new type of sauce may make the consumer ill.

In another example, a print area on a label to be attached to a food item may be too small for the total list of ingredients. This may occur if there has been an update in the list of ingredients for that food item—the old ingredient list may have fitted onto the label, but the new ingredient list may be longer, and may not fit. The later included ingredients (which may be allergens to some people) may be omitted from the label. As another example, a printhead of a label printing machine may be damaged, thereby reducing the legibility or completeness of the ingredient label (for example, if the ingredient "egg" is to be printed by an area of the printhead which is damaged, this allergen may not be clearly displayed on the label (or may be omitted altogether)).

If an allergen is present in a food item but it is not included in the information on the food item's labelling, a consumer, that is allergic to the allergen, may purchase and ingest the food item and suffer an allergic reaction which may, in a serious case, ultimately result in the death of the consumer. Therefore, great care must be taken to ensure that a food item's label is up to date (e.g. with current allergen information) and that no information is omitted from the label which may be dangerous for an allergy sufferer. Further, in certain jurisdictions, there may be legal obligations to list all up-to-date ingredient data on the labelling of food items for allergy sufferers, to prevent such a scenario occurring.

Therefore, for the safety of consumers and to comply with the laws of a jurisdiction, there is required a means to ensure that label information for food items is kept up-to-date and complete. Examines disclosed herein may address one or more of the above problems

SUMMARY

In an aspect, there is provided a control module for a labelling apparatus, the control module comprising: an input configured to receive a label generation request indicating a food item to be labelled; an output configured to provide a print signal to a label printing device; and a processor configured to: identify a set of ingredients of the indicated food item in response to receipt of the label generation request; verify that the identified set of ingredients of the food item is a most recent set of ingredients of the food item; if the identified set of ingredients of the food item is verified as the most recent set of ingredients of the food item, output the print signal to cause the label printing device to print an information label indicating the set of ingredients of the food item; and if the identified set of ingredients of the food item cannot be verified as the most recent set of ingredients of the food item, prevent provision of the print signal to the label printing device.

The first ingredient data may be indicative of the set of ingredients of the indicated food item and may be stored at a local storage local to the control module. Second ingredient data may be indicative of a second set of ingredients of the food item and may be stored at a remote server remote from the control module. The processor may be configured to identify the most recent set of ingredients of the indicated food item from the first ingredient data and the second ingredient data, and output the print signal to cause the label printing device to print the information label indicating the most recent set of ingredients of the food item identified from the first and second ingredient data.

The processor may be configured to check if the first ingredient data is as recent as the second ingredient data. If the first ingredient data is as recent as the second ingredient data, the processor may output the print signal to cause the label printing device to print the information label indicating the most recent set of ingredients of the food item based on the first ingredient data. If the first ingredient data is less recent than the second ingredient data, the processor may retrieve the second ingredient data from the remote server and output the print signal to cause the label printing device to print the information label indicating the most recent set of ingredients of the food item based on the retrieved second ingredient data.

Checking if the first ingredient data is as recent as the second ingredient data may comprise one or more of: matching a timestamp of recordal of the first ingredient data with a timestamp of recordal of the second ingredient data; matching a version identifier of the first ingredient data with a version identifier of the second ingredient data; and matching each of the ingredients indicated by the first ingredient data with a corresponding ingredient indicated by the second ingredient data.

The processor may be configured to attempt to establish communication between the control module and the remote server, and if communication between the control module and the remote server cannot be established, prevent provision of the print signal to the label printing device.

The processor may be configured to, following establishment of communication between the control module and the remote server, attempt to synchronise the first and second ingredient data, and if the first and second ingredient data cannot be synchronised, prevent provision of the print signal to the label printing device.

The processor may be configured to attempt to synchronise the first and second ingredient data: periodically; based on receipt of a synchronisation indication provided in dependence on a synchronisation user input; and/or based on a change made to the second ingredient data.

The processor may be configured to, if the first ingredient data cannot be verified as indicating the most recent set of ingredients of the food item, provide an error indication to an error output device to cause an error alert to be output.

The processor may be configured to determine a printed size that the set of ingredients of the food item occupies once printed, determine whether the printed size of the set of ingredients fits within an available printing area of a label to be printed, and if the printed size of the set of ingredients does not fit within the available printing area of a label to be printed, prevent provision of the print signal to the label printing device.

The processor may be configured to, if the printed size of the set of ingredients does not fit within the available printing area of a label to be printed, provide an error indication to an error output device to cause an error alert to be output.

The processor may be configured to receive, from a label printing device comprising a printhead having a plurality of print nozzles, a fault signal indicating that a predetermined number of print nozzles are not operational, and prevent provision of the print signal to the label printing device in dependence on the fault signal.

The predetermined number of print nozzles that are not operational may be neighbouring print nozzles configured to print within an area of a label of predetermined dimensions.

The control module may be configured to output the print signal to control the label printing device to print the information label to indicate one or more of: the current date of label printing; the current time of label printing; the date when the most recent set of ingredients was last updated; the name of the food item; and an identifier indicating the person who generated the label generation request.

The set of ingredients printed on the information label may indicate one or more allergens.

The control module may be configured to compare each of the ingredients in the set of ingredients with a list of allergens, and if an ingredient of the set of ingredients matches an allergen in the list of allergens, generate the print signal to cause the ingredient identified as an allergen to be printed in a highlighted style by the label printing device.

In another aspect, there is provided a label printing apparatus comprising: the control module; an input device configured to receive a user input and transmit the label generation request to the input of the control module in dependence on the received user input; and a label printing device connected to the output of the control module, the label printing device configured to receive the print signal from the control module and print an information label in dependence on receipt of the print signal.

The label printing apparatus may comprise an output indicator configured to provide an indication, to a user, in dependence on the control module preventing provision of the print signal to the label printing device.

The label printing apparatus may be one or more of: a weighing scale, a food preparation device, a printer, and a payment device.

In another aspect, there is provided a controller for ordering fresh goods, wherein the controller comprises: at least one electronic processor having an electrical input for receiving a label generation request indicating a food item to be labelled; and at least one memory device electrically coupled to the at least one electronic processor and having instructions stored therein; wherein the at least one electronic processor is arranged to access the at least one memory device and execute the instructions thereon so as to: identify a set of ingredients of the indicated food item in response to receipt of the label generation request; verify that the identified set of ingredients of the food item is a most recent set of ingredients of the food item; if the identified set of ingredients of the food item is verified as the most recent set of ingredients of the food item, output the print signal to cause the label printing device to print an information label indicating the set of ingredients of the food item; and if the identified set of ingredients of the food item cannot be verified as the most recent set of ingredients of the food item, prevent provision of the print signal to the label printing device.

In another aspect, there is provided a computer-implemented method for printing an information label for a food item, the method comprising: receiving a label generation request indicating a food item to be labelled; identifying a set of ingredients of the indicated food item in response to receipt of the label generation request; verifying that the identified set of ingredients of the food item is a most recent set of ingredients of the food item; if the identified set of ingredients of the food item is verified as the most recent set of ingredients of the food item, outputting the print signal to cause the label printing device to print an information label indicating the set of ingredients of the food item; and if the identified set of ingredients of the food item cannot be verified as the most recent set of ingredients of the food item, preventing provision of the print signal to the label printing device.

In another aspect, there is provided a computer readable storage medium including instructions to perform a method comprising: receiving a label generation request indicating a food item to be labelled; identifying a set of ingredients of the indicated food item in response to receipt of the label generation request; verifying that the identified set of ingredients of the food item is a most recent set of ingredients of the food item; if the identified set of ingredients of the food item is verified as the most recent set of ingredients of the food item, outputting the print signal to cause the label printing device to print an information label indicating the set of ingredients of the food item; and if the identified set of ingredients of the food item cannot be verified as the most recent set of ingredients of the food item, preventing provision of the print signal to the label printing device.

In another aspect, there is provided a control module, comprising: an input configured to receive a label generation request indicating a food item to be labelled; a processor configured to: retrieve a set of ingredients of the indicated food item in response to receipt of the label generation request; and generate a label preview to be displayed on a display screen, wherein the label preview includes the retrieved set of ingredients and is configured to appear the same as a printed version of the label; and an output configured to provide a display signal to a display screen to cause the label preview to be displayed on a display screen.

In another aspect, there is provided a computer-implemented method for displaying a label preview, the method comprising: receiving a label generation request indicating a food item to be labelled; retrieving a set of ingredients of the indicated food item in response to receipt of the label generation request; generating a label preview to be displayed on a display screen, wherein the label preview includes the retrieved set of ingredients and is configured to appear the same as a printed version of the label; and providing a display signal to a display screen to cause the label preview to be displayed on a display screen.

In another aspect, there is provided a computer readable storage medium including instructions to perform a method comprising: receiving a label generation request indicating a food item to be labelled; retrieving a set of ingredients of the indicated food item in response to receipt of the label generation request; generating a label preview to be displayed on a display screen, wherein the label preview includes the retrieved set of ingredients and is configured to appear the same as a printed version of the label; and providing a display signal to a display screen to cause the label preview to be displayed on a display screen.

BRIEF DESCRIPTION OF THE DRAWINGS

One or more examples will now be described, by way of example only, with reference to the accompanying drawings, in which.

DETAILED DESCRIPTION

Figure 1A:
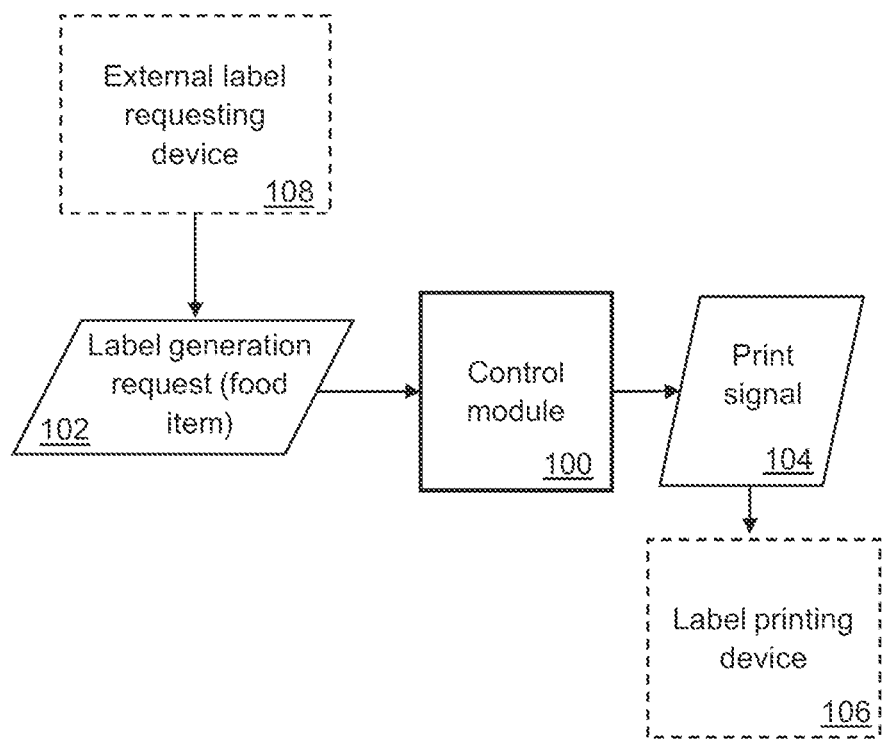
FIG. 1A show an example of a control module according to examples disclosed herein.

Examples disclosed herein relate to a control module for ensuring that a printed label for a food item is complete, for example, by ensuring that a printed ingredient label for a food item includes the most recent ingredient data, is legible, and is complete. This is so that, for example, an allergy sufferer can see correct and relevant information about the ingredients contained in the food item to determine whether the food item is safe to consume. Of course these considerations are not only relevant for allergy sufferers but for all consumers who wish to know what they are eating (for example, vegetarians and vegans).

Within supermarkets, food packaging factories, and other food vending and preparation locations, there may be the facility to package food items (including mix-and-match or customised combination food items such as sandwiches and pizzas, and including fresh items such as food items prepared and/or baked in store), as well as print any required information (for example, as required by law, and for consumer information purposes) for display on the packaging of the food items. Such information may include a list of ingredients that are included within the specific food item. For example, a packet of cookies may have printed on it the ingredients of: butter, light brown sugar, granulated sugar, vanilla extract, egg, plain flour, bicarbonate of soda, salt, and chocolate chips. Common ingredients, such as egg, in the example above, are known allergens that, when ingested by an egg allergy sufferer, may produce an allergic reaction which may result in minor irritations to skin, dizziness, vomiting, or even death. Therefore, it is important that all potential allergens are included on food items (i.e. on the packaging of the food item). Further, in some examples, due to the serious nature of some food allergies, food labelling may also list allergens that are not included in the specific food item, but are prepared in the vicinity of the food item, in the case of cross contamination (e.g. "item prepared in a factory which uses nuts").

However, there are scenarios whereby an ingredient label for a food item may not clearly display current allergen information for a food item. As an example, a common system may comprise a local label printing device connected over a computer network to a central remote server. Ingredient data for the food item may be updated centrally at the remote server. The local label printing apparatus may access a locally stored recent ingredient list for a food item, and may connect over computer network to the remote server to retrieve any newer or updated ingredient information for the food item. However, a possible risk of using such a system is that the label printing apparatus may experience a period whereby connection to the computer network is not possible due to power outage, network outage, or other issue. Therefore, if the list of ingredients for a specific food item is updated at the remote server during a time where the label printing apparatus is not connected to the computer network, the label printing apparatus may continue to operate, using an out-of-date ingredients list (which may omit a potential allergen) that may put allergy suffers at risk of an allergic reaction if the allergen sufferer consumes the food item believing it to be safe, since the allergen is not shown on the label.

As another example, the size of a food labelling area on an item of food packaging is finite. Therefore, for food items that comprise a large number of ingredients, there is a possibility that some ingredients may be omitted from a food item's ingredient label (i.e. may be printed "off the end" of the labelling area), risking omitting a potential allergen and placing allergy sufferers at risk because they would not be able to see that a chosen food item contains an allergen.

As another example, an error of the ability of the label printers to print a label clearly may occur. For example, labels may misfeed through the printing device, and may end up sticking to a printhead of the label printing apparatus instead of feeing through with the ingredients all clearly printed. In order to remedy the label misfeed, an operator may be required to manually remove a label and ensure the subsequent labels feed correctly into the label printing apparatus' printhead. However, due to the fast paced nature of food item preparation and vending (e.g. in order to meet production quotas), or due to carelessness, an operator may use an unwarranted force and/or an instrument to remove any misfed labels, causing damage to the printhead. Such printhead damage may not be visible to the eye of an operator but may be detrimental to print quality, and print legibility and completeness may be affected. Therefore, in response to the printhead damage, allergens may not be clearly and legibly printed on to an ingredient label, again increasing the risk for an allergy sufferer to see whether a specific allergen is an ingredient for a food item. Examples disclosed herein may solve one or more of the above-mentioned problems.

An example control module 100 is illustrated in FIG. 1A. The term "food item ingredient label"/"ingredient label" throughout this disclosure may be taken to mean a label that is printed for affixing to a food item or the packaging of a food item. The control module 100 comprises an input configured to receive a label generation request 102 indicating a food item to be labelled. As an example, the label generation request 102 may be received from an external label requesting device 108 that is connected to the control module 100, using a wired network, a wireless network, or any other network known to those in the art. For example, the external label requesting device 108 may be a remote computer, a mobile device, or at a fixed label requesting point within a food preparation or vending location (e.g. a kiosk within a food preparation factory or a supermarket). The control module 100 may be comprised within a label printing apparatus and the label generation request 102 may be received from a label requesting device 108 of the label printing apparatus (i.e. the label requesting device 108 may be local to the control module 100).

The control module 100 comprises an output configured to provide a print signal 104 to a label printing device 106. The print signal 104 may be a digital signal that indicates a list of ingredients that are included in a food item that is the subject of the label generation request. The label printing device 106 may be an external printing device that is connected to the control module 100, using a wired network, a wireless network, or any other network. For example, the external printing device 106 may be any of a remote printer, remote smart printer, or printer comprised within a remote device. Alternatively, the control module 100 may be comprised within a label printing apparatus and the print signal 104 may be sent to a label printing device 106 of the label printing apparatus (i.e. the label printing device 106 is local to the control module 100).

Figure 1B:
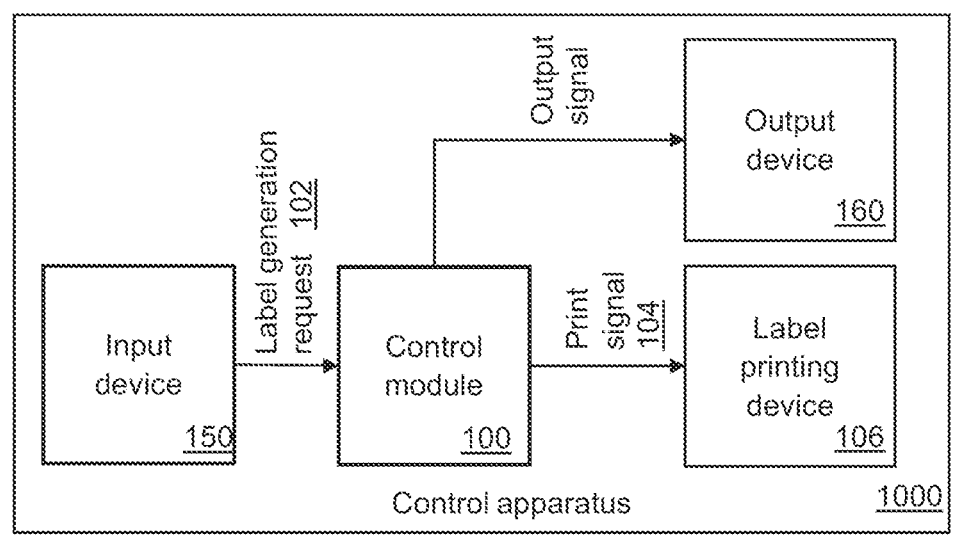
FIG. 1B shows an example of a control apparatus comprising a control module according to examples disclosed herein.

FIG. 1B shows an example of a control apparatus 1000 comprising the control module 100, an input device 150, and a label printing device 106. The input device 150 of the control apparatus 1000 is configured to receive a user input and transmit the label generation request 102 to the input of the control module 100 in dependence on the received user input. For example the input device 150 may be a button, a touch screen, a keyboard, or a microphone, for example. The label printing device 106 of the control apparatus 1000 is connected to the output of the control module 100 and is configured to receive the print signal 104 from the control module 100 and print an information label in dependence on receipt of the print signal 104. The control apparatus 1000 may comprise an output indicator 160. The output indicator 160 may be configured to provide an indication, to a user, in dependence on the control module 100 preventing provision of the print signal to the label printing device 106. For example, the output indicator 160 may comprise a display screen, and LED, or a speaker. In an example, the output indicator 160 may be included in the input device 150 of the control apparatus. For example, the input device 150 and the output device 160 may be a single touchscreen, through which a user may interact with the control apparatus 100. In some embodiments, the control apparatus 100 may be one or more of a weighing scale, a food preparation device, a printer, and a payment device.

Figure 2:
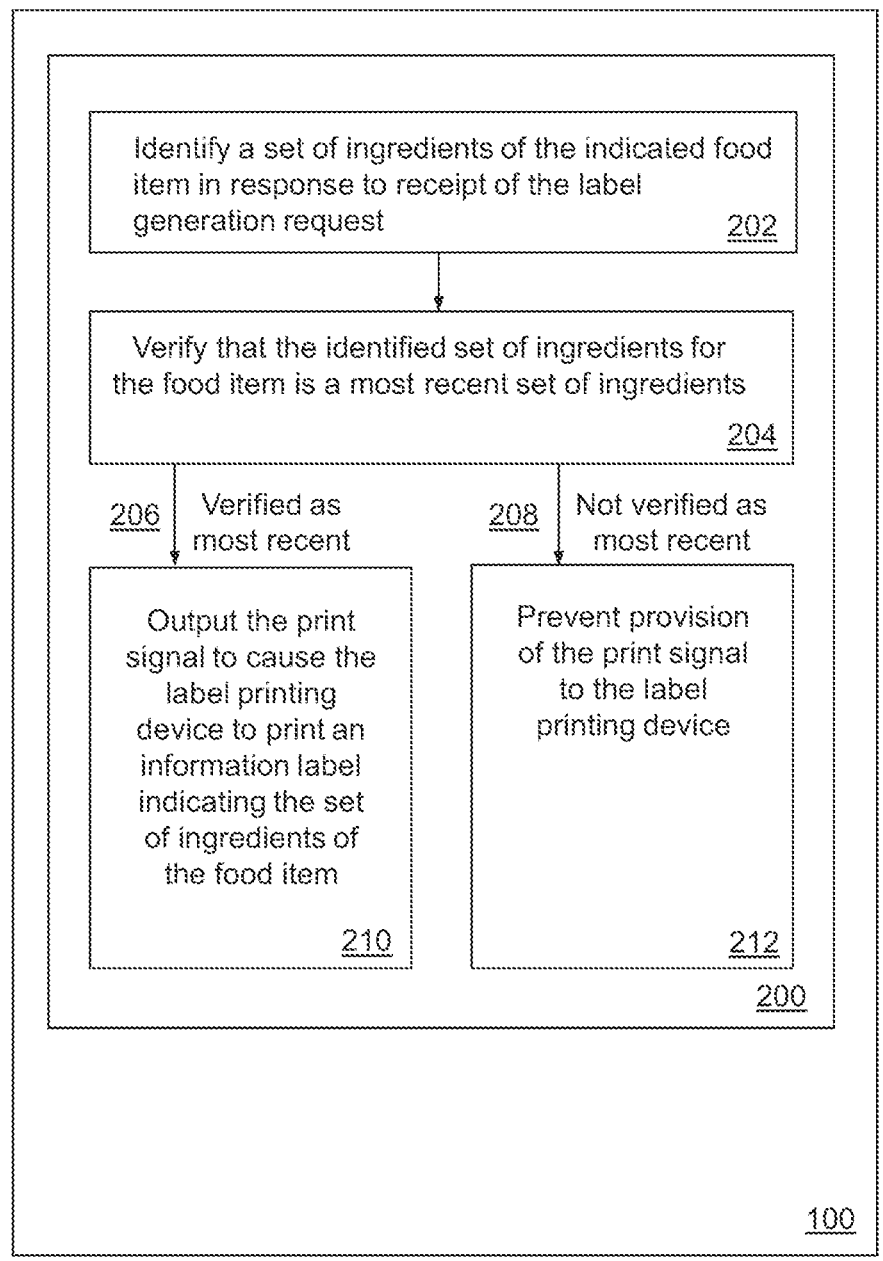
FIG. 2 shows an example of processor operations to control label printing according to examples disclosed herein.

The control module 100 comprises a processor 200, as illustrated schematically in FIG. 2. The processor 200 is configured to identify a set of ingredients of the indicated food item in response to receipt of the label generation request 202. For example, if a label generation request indicating the food item as a chocolate chip cookie is received by the processor, the processor identifies the set of ingredients as: butter, light brown sugar, granulated sugar, vanilla extract, egg, plain flour, bicarbonate of soda, salt, and chocolate chips. Along with the ingredients that are included within the corresponding food item, the quantity of the ingredients (e.g. in grams or any other convenient unit) may also be included. Other food item related information may also be retrieved which is relevant for inclusion on the food item label, such as where the food item has been prepared (for example, in a location which also handled one or more allergens, and what those allergens are).

Figure 4:
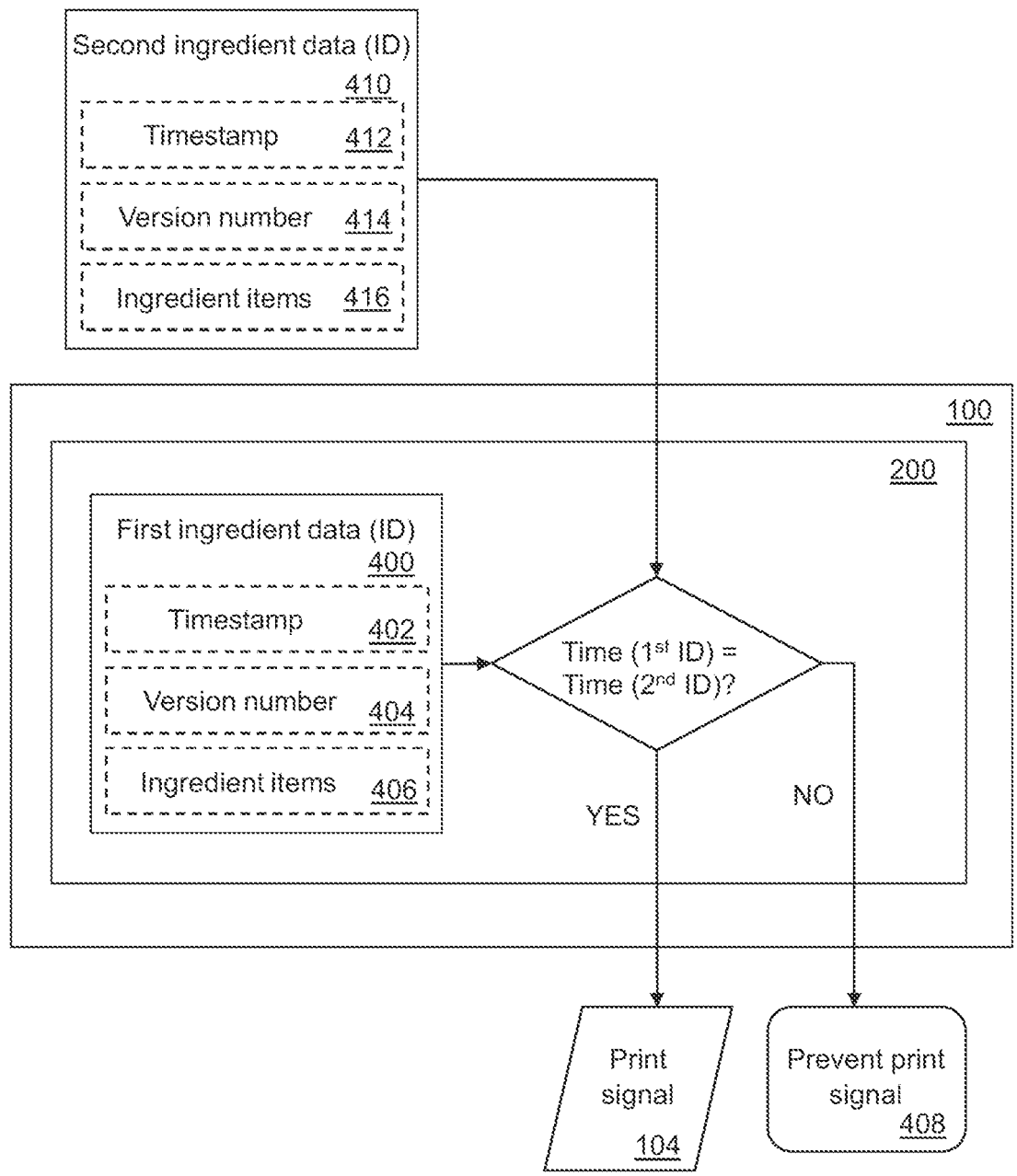
FIG. 4 shows an example of verifying ingredient data according to examples disclosed herein.

The processor 200 is configured to verify that the identified set of ingredients for the food item is a most recent set of ingredients 204. An example is illustrated in FIG. 4. If the identified set of ingredients of the food item is verified as the most recent set of ingredients of the food item 206, the processor 200 is configured to output the print signal 104 to cause the label printing device to print an information label indicating the set of ingredients of the food item 210. If the identified set of ingredients of the food item cannot be verified as the most recent set of ingredients of the food item 208, the processor 200 is configured to prevent provision of the print signal to the label printing device. Advantageously, by preventing provision of the print signal to the label printing device in the case that the identified set of ingredients cannot be verified as the most recent set of ingredients of the food item, an outdated, and potentially life-threatening, set of ingredients is prevented from being printed on the information label. The details of how a set of ingredients can be verified as the most recent set of ingredients are discussed below.

Figure 3:
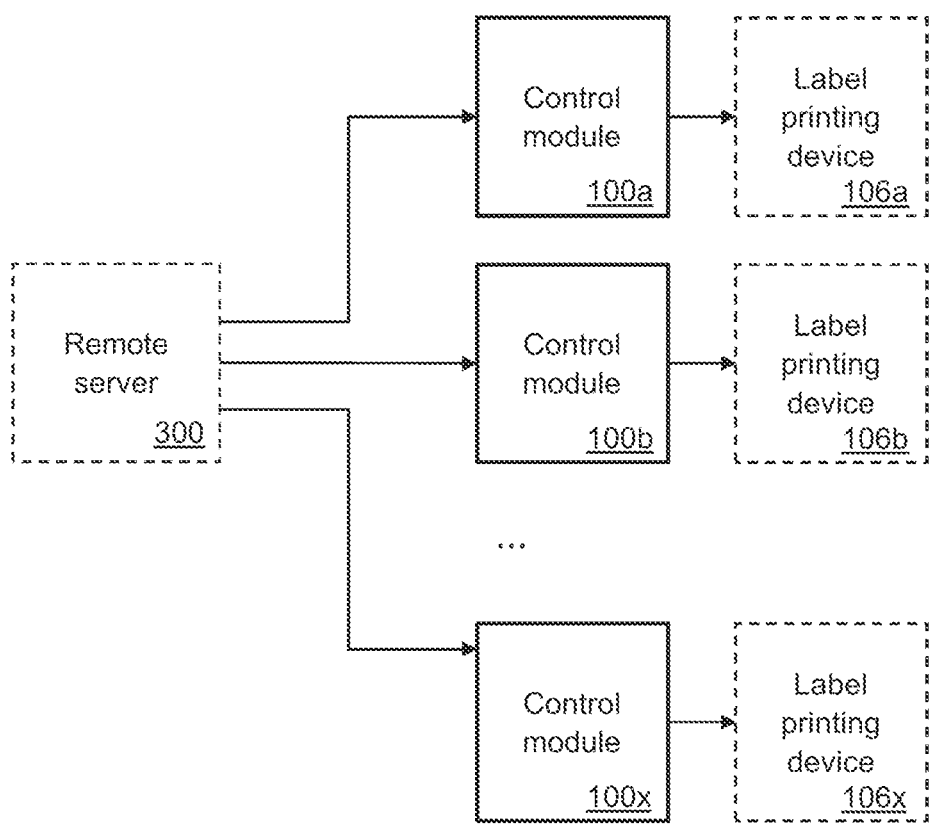
FIG. 3 shows an example computer network of a remote server and plural control modules according to examples disclosed herein.

The set of ingredients may originate from ingredient data. Ingredient data may be computer-readable data comprising at least one of: the ingredients of a corresponding food item, the respective quantities of each of the ingredients, a timestamp of recordal of the ingredient data, and a version identifier of the ingredient data. First ingredient data indicative of the set of ingredients of the indicated food item may be stored at a local storage local to the control module 100. For example, the local storage may be a storage module directly connected to the processor of the control module 100 or directly connected to the control module 100. Second ingredient data indicative of a second set of ingredients of the indicated food item may be stored at a remote server 300 remote from the control module 100 (i.e. remote storage). For example, the remote server 300 may be a host server for a plurality of other control modules 100, providing the same or similar functionality of the control module 100. FIG. 3 shows an example computer network comprising a remote server 300 (e.g. located at a central factory or office) and a plurality of control modules 100a-x connected to respective printing devices 106a-x (e.g. located a various retail outlets or food counters within a food store).

The processor 200 may be configured to identify the most recent set of ingredients of the indicated food item from the first ingredient data 400 and the second ingredient data 410, as illustrated in FIG. 4. For example, the remote server 300 may be a server used by a food packaging or vending company to upload the most recent ingredient data (i.e. the second ingredient data 410) for food items it offers when the food item ingredient data has officially changed (e.g. an extra ingredient is included in a food item). The processor 200 may, for example, compare a timestamp 402 of the first ingredient data 400 stored locally, and a timestamp 412 of the second ingredient data 410 stored at the remote server 300. If the timestamp 402, 412 of the first and second ingredient data 400, 410 is the same, then the ingredient data 400 stored at the control module 100 may be taken to be the most up to data as it is as recent as the data 410 stored remotely.

Once the processor 200 has identified the most recent set of ingredients, the processor 200 may be configured to output the print signal 104 to cause the label printing device to print the information label indicating the most recent set of ingredients of the food item identified from the first and second ingredient data 400, 410. The processor 200 may be configured to, if the first ingredient data 400 is as recent as the second ingredient data 410, output the print signal 104 to cause the label printing device to print the information label indicating the most recent set of ingredients of the food item based on the first ingredient data 400. That is, if the set of ingredient data 410 stored at the remote server is determined to be as recent as the ingredient data 400 stored locally, so the processor 200 may use the locally stored ingredient data 400 to print the label. If the timestamp 402 of the first ingredient data 400 is earlier than the timestamp 412 of the second ingredient data 410, then the ingredient data 400 stored at the control module 100 may be taken to be out of date because a more recent ingredient data set 410 is present at the remote server. In this example the processor may prevent printing 408 of the label because the ingredient data may not be correct.

The processor 200 may be configured to, if the first ingredient data 400 is less recent than the second ingredient data 410, retrieve the second ingredient data 410 from the remote server and output the print signal 104 to cause the label printing device to print the information label indicating the most recent set of ingredients of the food item based on the retrieved second ingredient data 410. As an example, the processor may be configured to, in the case where the first ingredient data 400 is less recent than the second ingredient data 410, use the retrieved second ingredient data 410 that is stored at the remote storage to overwrite the first ingredient data 400. The processor 200 may, for example, retrieve the most recent ingredient data 410 from the remote server and update the locally stored ingredient data 400 before printing the label 104. If the first ingredient data 400 is overwritten by the second ingredient data 410, the processor 200 may be configured to archive the first ingredient data 400, for example, by storing the first ingredient data 400 in the local storage or cause it to be stored at the remote server.

Checking if the first ingredient data 400 is as recent as the second ingredient data 410, by the processor 200, may comprise at least one of: matching a timestamp of recordal 402 of the first ingredient data 400 with a timestamp of the recordal 412 of the second ingredient data 410; matching a version identifier 404 of the first ingredient data 400 with a version identifier 414 of the second ingredient data 410; and matching each of the ingredients 406 indicated by the first ingredient data 400 with a corresponding ingredient 416 indicated by the second ingredient data 410. For example, if the time stamp of recordal 402 of the first ingredient data 400 is "30-08-2020 13:45:53" and the time stamp of recordal 412 of the second ingredient data 410 is "30-08-2020 11:42:28", then the processor 200 may check that the first ingredient data 400 is as recent (e.g. within a predetermined time window of e.g. one hour) as the second ingredient data 410, and proceed to output the print signal 104 to cause the label printing device to print the information label indicating the most recent set of ingredients of the food item based on the first ingredient data 400.

As another example, if the time stamp of recordal 402 of the first ingredient data 400 is "30-08-2020 13:45:53" and the time stamp of recordal 412 of the second ingredient data 410 is "31-10-2020 18:45:16", then the processor 200 may determine that the first ingredient data 400 is less recent then the second ingredient data 410, and proceed to retrieve the second ingredient data 410 from the remote server and output the print signal 104 to cause the label printing device to print the information label indicating the most recent set of ingredients of the food item based on the retrieved second ingredient data 410. The first ingredient data 400 may be updated based on the newer second ingredient data 410. The process of matching timestamps 402, 412 may comprise matching the date and/or time within a time window, for example, to allow for delays in updating the second ingredient data 410 compared to the first ingredient data 400. The first ingredient data 400 may be updated first at a central server, followed by a "data update" which is rolled out to one or more control modules 100 to update the locally stored second ingredient data 410. For example, if the two dates are within one week, 24 hours, 12 hours, or one hour of each other, for example, they may be considered to relate to the same ingredient update and the same ingredients are assumed to be present in both data sets. Further verification may take place in some examples as discussed below.

As another example, if the version identifier 404 of the first ingredient data 400 is "v3.2.1" and the version identifier 414 of the second ingredient data 410 is "v3.2.1", then the processor 200 may check that the first ingredient data 400 is as recent as the second ingredient data 410, because they have the same version number 404, 414, and proceed to output the print signal 104 to cause the label printing device to print the information label indicating the most recent set of ingredients of the food item based on the first ingredient data 400. As another example, if the version identifier 404 of the first ingredient data 400 is "v3.2.1" and the version identifier 414 of the second ingredient data 410 is "v4.1.3", then the processor 200 may determine that the first ingredient data 400 is less recent then the second ingredient data 410, and proceed to retrieve the second ingredient data 410 from the remote server and output the print signal 104 to cause the label printing device to print the information label indicating the most recent set of ingredients of the food item based on the retrieved second ingredient data 410. The first ingredient data 400 may be updated using the more recent second ingredient data 410.

As another example, if the ingredients 406 indicated by the first ingredient data 400 are "butter, light brown sugar, granulated sugar, vanilla extract, egg, plain flour, bicarbonate of soda, salt, and chocolate chips" and the ingredients 416 indicated by the second ingredient data 410 are "butter, light brown sugar, granulated sugar, vanilla extract, egg, plain flour, bicarbonate of soda, salt, and chocolate chips", then the processor 200 may determine that the first ingredient data 400 is as recent as the second ingredient data 410 (since the ingredients in the two data sets are the same), and proceed to output the print signal 104 to cause the label printing device to print the information label indicating the most recent set of ingredients of the food item based on the first ingredient data 400. As another example, if the ingredients 406 indicated by the first ingredient data 400 are "butter, light brown sugar, granulated sugar, vanilla extract, egg, plain flour, bicarbonate of soda, salt, and chocolate chips" and the ingredients 416 indicated by the second data 410 are "butter, light brown sugar, granulated sugar, vanilla extract, egg, peanuts, plain flour, bicarbonate of soda, salt, and chocolate chips" then the processor 200 may determine that the ingredients are different (the second ingredient data 416 also includes "peanuts"), and check that the first ingredient data 400 is less recent then the second ingredient data 410 (e.g. from a timestamp or version number), and if so, proceed to retrieve the more recent second ingredient data 410 from the remote server and output the print signal 104 to cause the label printing device to print the information label indicating the most recent set of ingredients of the food item based on the retrieved second ingredient data 410. The above scenarios are described as examples only and any combination thereof may be made use of.

In examples in which the second ingredient data 410 is stored on a remote server 300 remote from the control module 100, a connection therebetween is required to be established when the processor 200 checks if the first ingredient data 400 is as recent as the second ingredient data 410. In an example, the control module 100 and the remote server 300 are always connected to each other. In another example, the processor 200 may be configured to establish communication between the control module 100 and the remote server 300. Within this example, the processor 200 may attempt to establish communication in dependence on receipt of the label generation request at the control module 100 and advantageously means that there is no requirement for an "always on" connection between the control module 100 and the remote server 300 and power that would have been expended on maintaining the connection is saved. The processor 200 may be configured to, if communication between the control module 100 and the remote server 300 cannot be established, prevent provision of the print signal to the label printing device, thereby removing the risk of out-of-date ingredient data from being printed on to an information label for a specific food item based on the first ingredient data 400.

The processor 200 may be configured to, following the establishment of communication between the control module 100 and the remote server 300, attempt to synchronise the first and second ingredient data 400, 410. This step, advantageously, ensures that, if the second ingredient data 410 is updated during the period of no communication between the control module 100 and the remote server 300, the first ingredient data 400 will be as recent as the second ingredient data 410. If the first and second ingredient data 400, 410 cannot be synchronised, the processor 200 may be configured to prevent the provision of the print signal to the label printing device, thereby removing the risk of out-of-date ingredient data from being printed on to an information label for a specific food item based on the first ingredient data 400.

The processor 200 may be configured to attempt to synchronise the first and second data periodically, and/or based on receipt of a synchronisation indication provided in dependence on a synchronisation user input, and/or based on a change made to the second ingredient data 410. As an example, the control module 100 may use an internal clock (e.g. processor clock) to determine whether a predetermined time since a previous attempt to synchronise the first and second data has elapsed. The predetermined time may be set by an operator or may be hard-programmed into the control module 100, for example. If the predetermined time has elapsed, then the control module 100 may attempt to synchronise the first and second ingredient data 400, 410, and thereby attempt to synchronise the first and second ingredient data periodically. As another example, the control module 100 may be functionally connected to a user interface (UI) into which an operator/user may input a synchronisation user input, thereby triggering a synchronisation indication to be delivered to the control module 100. Therefore, based on receipt of the synchronisation indication provided in dependence on the synchronisation user input, the control module 100 may attempt to synchronise the first and second ingredient data 400, 410. As another example, the control module 100 may synchronise the first and second data in response to receiving an indication that the second ingredient data 410 has been changed. Therefore, based on a change made to the second ingredient data 410, the control module 100 may attempt to synchronise the first and second ingredient data 400, 410. The above scenarios are described as examples only and any combination thereof may be envisaged.

The processor 200 in some examples may be configured to, if the first ingredient data 400 cannot be verified as the most recent set of ingredients of the indicated food item, provide an error indication to an error output device to cause an error alert to be output. The error alert may comprise one or more of a visual error signal, audio error signal, and a haptic output signal. As an example, the visual error signal may cause illumination of an LED functionally connected to the processor, or a textual error message (e.g. "synchronisation failed"). As an example, the audio error signal may a beep (e.g. a short, high pitched sound), or a spoken error message ("e.g. cannot verify data is up to date"). As an example, the haptic output signal may be a vibration (a "buzz") or a vibrational pattern. In this way, the operator can understand why a label has not been printed—at least, that there has been an error, and in some examples, an indication of what the error is.

When printing an information label indicating the most recent set of ingredients of the corresponding food item, the size of the area that can accommodate the label may be finite (e.g. it may be a label of finite size, or there may be a limit as to how large a label can be and still fit into the food item packaging). In a scenario in which the printed size of the set of ingredients does not fit within the available printing area of a label to be printed and the print signal is sent to the label printing device, information, such as ingredients (more particularly, an allergen), may be omitted from the label to be printed, thereby putting consumers at risk of an allergic reaction. To this end, the processor 200 in some examples may be configured to determine a printed size that the set of ingredients of the food item occupies once printed. For example, the processor 200 may determine that the total size of a printed information label is 25 cm2. The processor 200 may be configured to determine whether the printed sized of the set of ingredients fits within an available printing area of a label to be printed. For example, the processor 200 may obtain an available printing area of 20 cm2. If the printed size of the set of ingredients does not fit within the available printing area of a label to be printed, the processor 200 may be configured to prevent provision of the print signal to the label printing device. The processor 200 in some examples may be configured to, if the printed size of the set of ingredients does not fit within the available printing area of a label to be printed, provide an error indication to an error output device to cause an error alert to be output. The error alert may comprise one or more of a visual error signal, and audio error signal, and a haptic output signal. As an example, the error output device may be a device located locally to the control module 100. In another example the error output device may be a device located remotely to the control module 100.

As another example, the processor 200 may determine that the total size of a printed information label is 25 cm2. The processor 200 may be configured to determine whether the printed sized of the set of ingredients fits within an available printing area of a label to be printed, and in this example, the processor 200 obtain an available printing area of 30 cm2. If the printed size of the set of ingredients fits within the available printing area of a label to be printed, as in this example, the processor 200 allows provision of the print signal to the label printing device.

The omission of information, such as a name of a potential allergen, from an information label may also be the result of a damaged printhead of a label printing device. For example, if a label misfeeds into a printer, the label may stick to the printhead. To remove the stuck label, a careless operator may use unwarranted amounts of force and/or use a sharp instrument to pick out and remove the label. This may in turn cause damage to the printhead and the components within. For example, the printhead of the label printing device may comprise a plurality of print nozzles, which emit ink to print onto a label, and an operator poking at the printhead to remove a misfed label may damage a number of the print nozzles. In the scenario of even a small number of the plurality of print nozzles being damaged, legibility and completeness of a printed information label may be significantly affected. Any degradation of legibility of a printed information label that contains a list of ingredients may prove fatal in the case that an allergen is not clearly printed (or not printed at all) on to the printed information label (because it would have been printed by the nozzles which have been damaged). Overall, damage to any of a plurality print nozzles included in the printed head of the label printing device may decrease the readability of a printed label information, which is undesirable.

Figure 5:
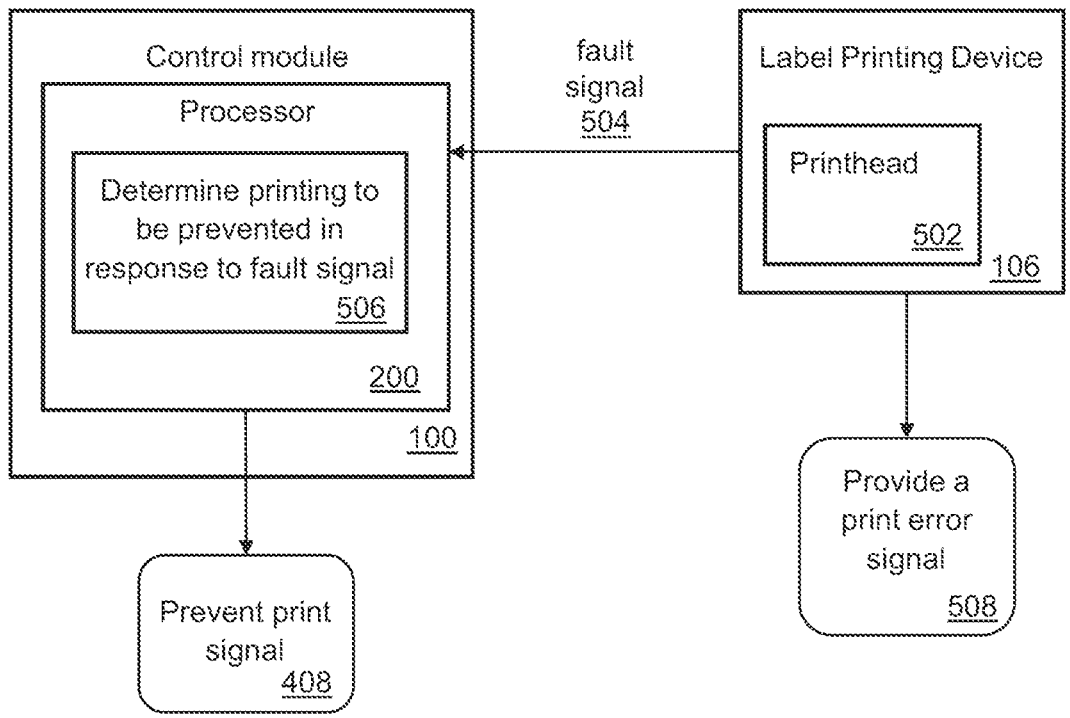
FIG. 5 shows an example of receiving a fault signal from a label printing device according to examples disclosed herein

An example label printing device 106 disclosed herein and illustrated in FIG. 5 and may comprise a printhead 502. The printhead 502 may comprise a plurality of print nozzles. The processor 200 may be configured to receive, from the label printing device 106 comprising the printhead having the plurality of print nozzles, a fault signal 504 indicating that a predetermined number of print nozzles are not operational. For example, for each respective print nozzle, a sensor may monitor an output and compare the output with a reference value. In this example, when the output of a nozzle is below the reference value, the nozzle may be deemed to be not operational. As another example, for each respective print nozzle, a sensor may monitor at least one of the physical attributes of the print nozzle (e.g. the print nozzle aperture, the height of the print nozzle and direction of the print nozzle) and compare the obtained values for the physical attributes with respective physical attribute reference values. In this example, when the output of a nozzle has changed by over a predetermined amount from the reference value, the nozzle may be deemed to be not operational. For example, for each nozzle, at least one sensor may monitor the output of a print nozzle and the physical attributes of the print nozzle to determine whether the print nozzle is operational or not. In an example, when a predetermined number of print nozzles are not operational, the label printing device 106 may generate a fault signal 504 indicating that the predetermined number of print nozzles are not operational and transmit the fault signal 504 to the processor 200. The predetermined number of print nozzles may be a total number of non-operational print nozzles within the printhead that are configured to print within an area of a label of predetermined dimensions. For example, when a total of 50 print nozzles are determined to be non-operational, the label printing device 106 may generate the fault signal 504 and send the fault signal to the processor 200. As another example, the predetermined number of nozzles may be a predetermined number of neighbouring print nozzles configured to print within an area of a label of predetermined dimensions. For example, when 50 neighbouring print nozzles are determined to be non-operational, the label printing device 106 may generate the fault signal 504 and send the fault signal 504 to the processor 200. The above are provided only as examples and may be used in isolation or in any combination to detect whether the predetermined number of print nozzles are not operational. Advantageously, the processor 200 receives the fault signal 504, indicating that the predetermined number of print nozzles are not operational, from the label printing device 106, and then the processor 200 may determine that printing should not take place 506. The processor 200 may prevent provision 408 of the print signal to the label printing device 106 in dependence on receipt of the fault signal 504, and so the risk of erroneously omitting information from an information label to be printed may be reduced.

As well as providing a fault signal 504 indicating that the predetermined number of print nozzles are not operational, the label printing device 106 may also be configured to generate and provide a printing error indication 508 to an error output device to cause an error alert to be output indicating a fault with the printing device. The print error may comprise one or more of a visual error signal, and audio error signal, and a haptic output signal. As an example, the visual error signal may comprise one or more of an LED and a textual error message. As another example, the visual error signal may be displayed on a UI of the error output device. As an example, the audio error signal may be at least one of a beep (e.g. a short, high pitched sound) and a spoken error message. As an example the haptic output signal may be a vibration or a vibrational pattern.

Figure 6:
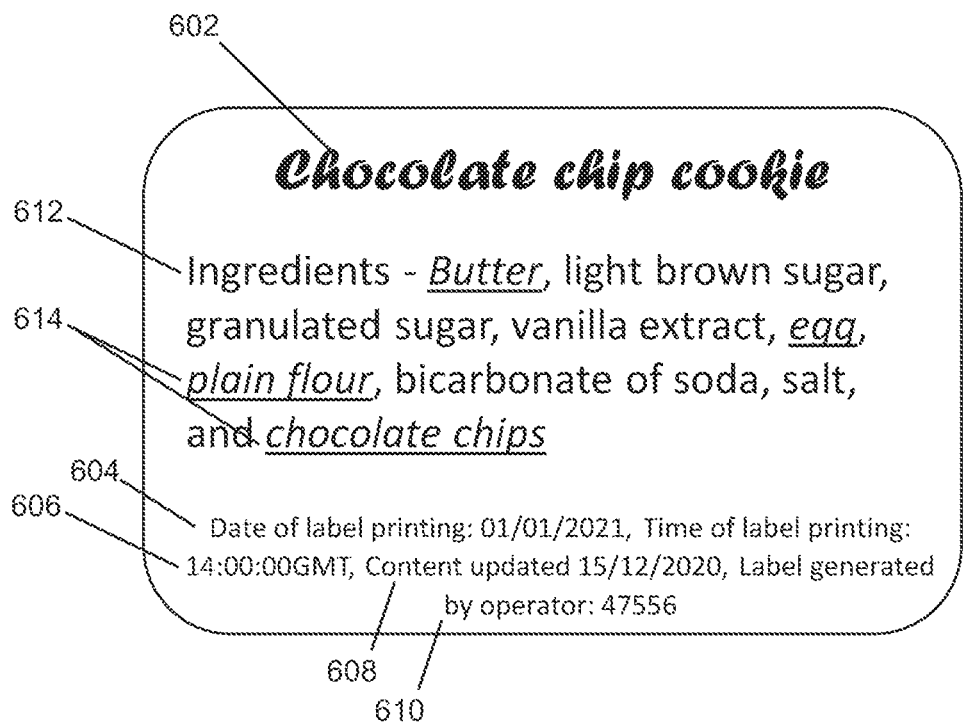
FIG. 6 shows an example printed label according to examples disclosed herein.

In any of the above examples, the control module 100 may be configured to output the print signal 104 to control the label printing device 106 to print the information label to indicate one or more of: the current date of label printing; the current time of label printing; the date when the most recent set of ingredients was last updated; the name of the food item; and an identifier indicating the person who generated the label generation request. An example printed label is shown in FIG. 6. For example, a printed information label may comprise "Date of label printing: 01/01/2021 604, Time of label printing: 14:00:00 GMT 606, Content updated 15/12/2020 608, Food item: Chocolate chip cookie 602, Label generated by: operator 47556 610". Further, because the information label indicates the set of ingredients 612 of a food item, the information label may indicate one or more allergens. For example, the information label may indicate at least one or more of milk, egg, wheat, peanut, tree nut, soy, fish, and shellfish. In an example, the control module 100 may be configured to compare each of the ingredients in the set of ingredients with a list of known allergens. In an example, the list of allergens may be stored in the local storage local to the control module 100. In another example, the list of allergens may be stored in the remote server remote to the control module 100. The control module 100 may be configured to, if an ingredient of the set of ingredients matches an allergen in the list of allergens, generate the print signal to cause the ingredient identified as an allergen to be printed in a highlighted style 614 (e.g. in bold, in colour, in italics, or otherwise) by the label printing device 106. In this way, even if the ingredients used to make a product do not change, if one of those ingredients is later considered to be an allergen which should be highlighted on the label, possibly for legislative purposes, the allergen list may be updated, without requiring changes or updates to each list of ingredients of each different food product offered, and the printed ingredient information for each food item may still be printed in a suitable way.

Figure 7:
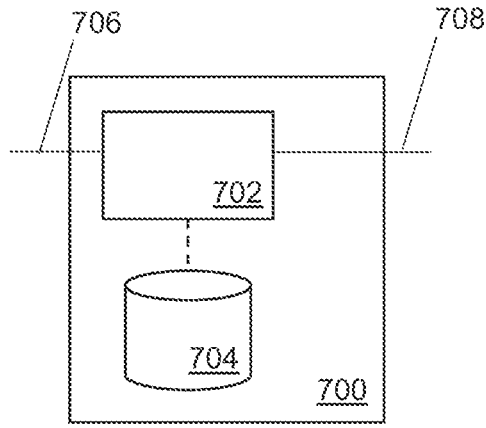
FIG. 7 shows an example controller according to examples disclosed herein.

FIG. 7 shows an example controller 700 for the label printing apparatus. The controller 700 comprises at least one electronic processor 702 and at least one memory device 704. The at least one electronic processor 702 may comprise an electrical input 706 for receiving a label generation request indicating a food item to be labelled. For example the electrical input 706 may receive a label generation request from the input device comprised within the control apparatus. The at least one memory device 704 may be electrically coupled to the at least one electronic processor 702 and having instructions stored therein, and the at least one electronic processor 702 may be arranged to access the at least one memory device 704 and execute the instructions thereon so as to: identify a set of ingredients of the indicated food item in response to receipt of the label generation request; verify that the identified set of ingredients of the food item is a most recent set of ingredients of the food item; if the identified set of ingredients of the food item is verified as the most recent set of ingredients of the food item, provide a print signal at an electrical output 708 to cause the label printing device to print an information label indicating the set of ingredients of the food item; and if the identified set of ingredients of the food item cannot be verified as the most recent set of ingredients of the food item, prevent provision of the print signal to the label printing device.

The controller 700 may comprise one or more electronic processors 702 (e.g., a microprocessor, a microcontroller, an application specific integrated circuit (ASIC), Boolean logic circuitry, etc.) that is configured to execute the stored instructions. The term "controller," "control unit," or "computational device" may be understood to include a single controller, control unit, or computational device, or a plurality of controllers, control units, or computational devices collectively operating to provide the required control functionality.

The set of instructions may be embedded in said one or more electronic processors of the controller; may be stored in a memory, or may be provided as software to be executed in the controller. The memory may comprise any suitable memory device and may store a variety of data, data structures, and/or instructions thereon. For example, the memory may store instructions for software, firmware, programs, algorithms, scripts, applications that may control or cause suitable apparatus to perform all or part of the methodology described herein.

Figure 8:
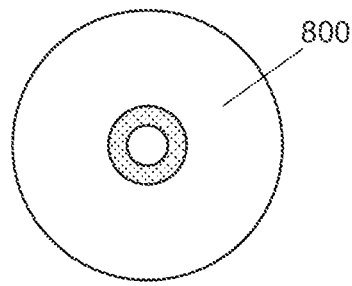
FIG. 8 shows a computer readable medium according to examples disclosed herein.
Figure 9:
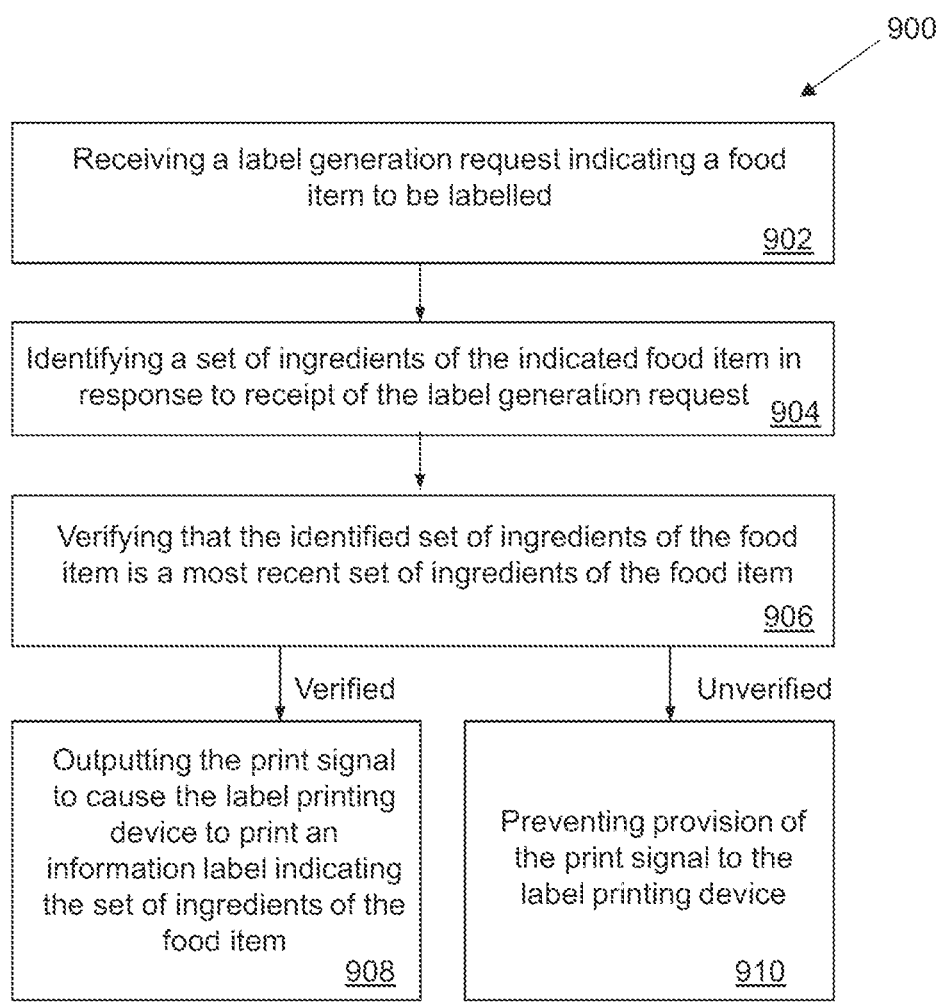
FIG. 9 shows an example method of providing an order preparation initiation time according to examples disclosed herein.
Figure 10:
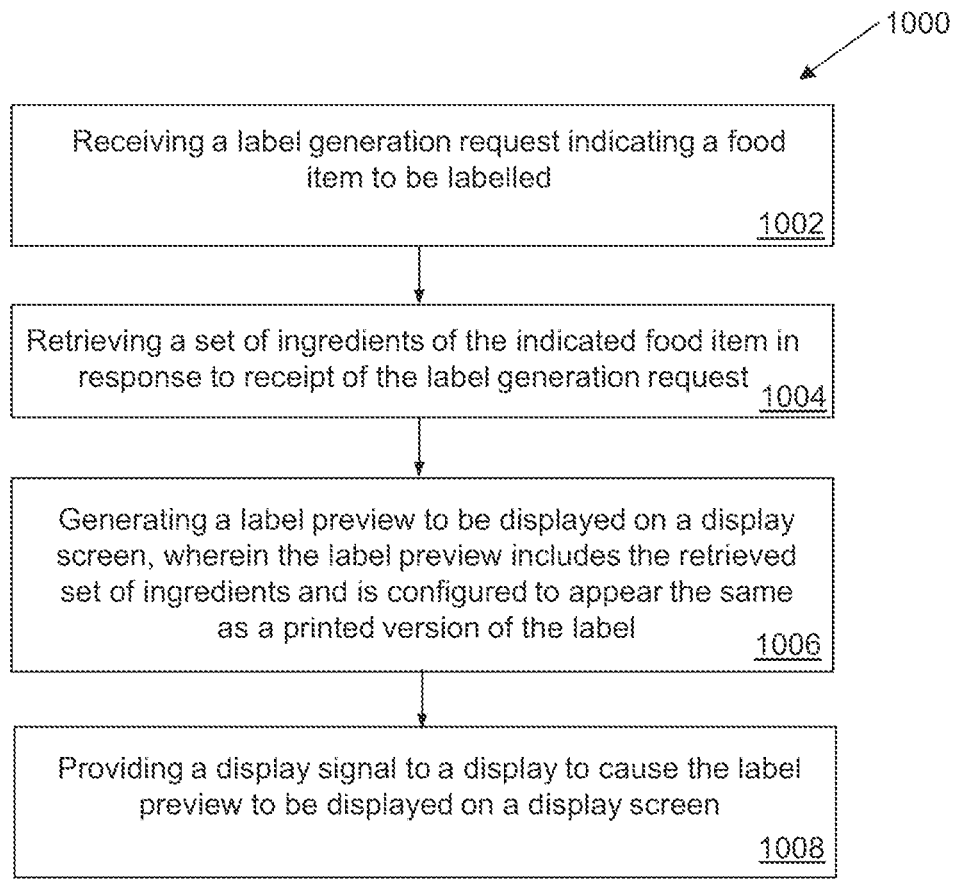
FIG. 10 illustrates an example of a method for checking the content and layout of a label on screen prior to printing according to examples disclosed herein.

FIG. 8 shows a computer readable medium 800 including instructions to perform any method disclosed herein, for example the method of FIG. 9 or FIG. 10. The memory may comprise a computer-readable storage medium 800 (e.g. a non-transitory, non-volatile or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM and EEPROM); flash memory; or electrical or other types of medium for storing such information/instructions.

FIG. 9 shows an example computer implemented method 900 comprising: receiving a label generation request indicating a food item to be labelled 902, identifying a set of ingredients of the indicated food item in response to receipt of the label generation request 904, verifying that the identified set of ingredients of the food item is a most recent set of ingredients of the food item 906. If the identified set of ingredients of the food item is verified as the most recent set of ingredients of the food item, outputting the print signal to cause the label printing device to print an information label indicating the set of ingredients of the food item 908, and if the identified set of ingredients of the food item cannot be verified as the most recent set of ingredients of the food item, preventing provision of the print signal to the label printing device 910.

FIG. 10 illustrates an example of a computer-implemented method for checking the content of a label on screen prior to printing the label according to examples disclosed herein. The computer-implemented method 1000 is for displaying a label preview. The method 1000 comprises receiving a label generation request indicating a food item to be labelled 1002. The label generation request may be a signal triggered by a user input indicating that they wish a label to be printed, or triggered during an automated or semi-automated food item packaging and labelling process, for example.

The method 1000 comprises retrieving a set of ingredients of the indicated food item in response to receipt of the label generation request 1004. Thus, to generate and print the label, the ingredients to be indicated on the label are retrieved. This may be done in accordance with one or more examples discussed herein, to ensure the ingredients to be included on the label are the most up to date available. The method 1000 comprises generating a label preview to be displayed on a display screen 1006, wherein the label preview includes the retrieved set of ingredients and is configured to appear the same as a printed version of the label. That is, from the list of ingredients which is retrieved, the method processes the ingredient data (and possibly other data such as label size, label format, preferred font, and additional information to be included such as prepared-by date, use-by date etc.) into a data file for display, to indicate what the label will look like once printed. In some examples, the label generation request may be transmitted to a virtual "scale" or "label printer" machine (e.g. in the cloud) which generates a label preview which appears in the same way as a physically printed label would do when printed on an equivalent physical scale or label printer. The virtual "scale" or "label printer" machine may generate a JPEG image, for example, matching the appearance (i.e. scale, dimensions, colours, fonts etc.) of the label when physically printed.

The method 1000 then comprises providing a display signal to a display screen to cause the label preview to be displayed on a display screen 1008. The display signal may be, for example, a signal transmitting a generated JPEG image from the virtual "scale" or "label printer" machine to a display screen. In this way, a digital preview may be displayed, so it can be verified that the label will be printed in an appropriate way before the label is physically printed out to create a label to affix onto a package. For example, it is important for the label to include all of the listed ingredients and not omit any because the label is too small or the display font is too large, for example.

Figure 11:
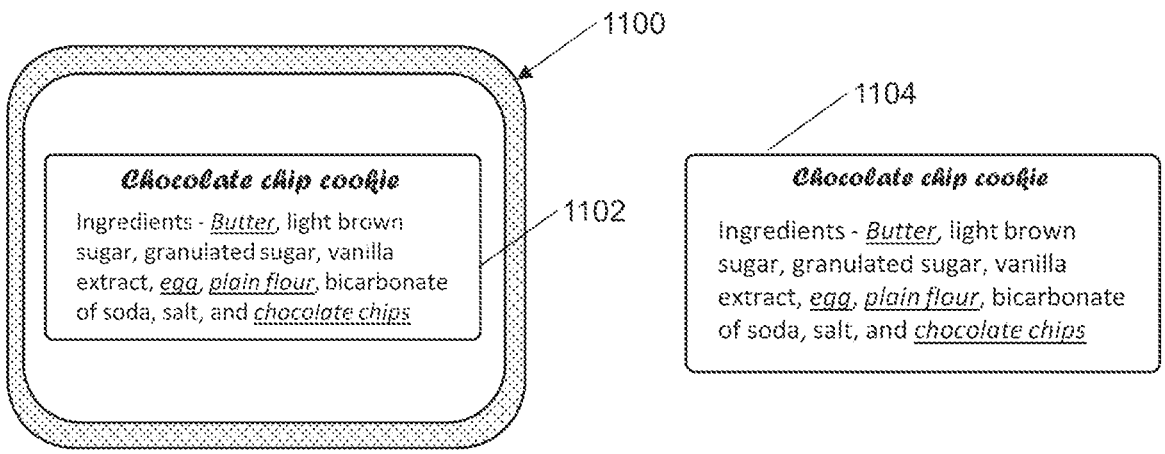
FIG. 11 illustrates an example of a display screen allowing for checking of the content of a label on screen prior to printing according to examples disclosed herein.

FIG. 11 shows an example display screen 1100 displaying a label preview 1102. The label preview may be generated by a "virtual" label printer which is configured to generate an image of a label which matches a label physically printed out by a physical label printer corresponding to the virtual label printer. Once the label preview 1102 is determined to be correctly showing the information, the label 1104 may be printed off using a physical printer, and the layout and content of the physical label 1104 matches the preview label 1102 displayed on the display screen 1100. Of course the label may comprise other information such as that indicated in FIG. 6.

This WYSIWYG (what-you-see-is-what-you-get) interface allows for generated labels 1102 to be previewed prior to printing and the printed label looks the same as the preview shown on the display screen. Without such a preview 1102, a label may be checked and produced (for example, following an ingredient change or label size change) by firstly, an authorised person or technologist (e.g. a food technologist managing the ingredient list) making a change to the information to appear on the label for a product. This change may be made at a location and by a person or process which is remote from (e.g. at a head office) the label printer (e.g. in a supermarket) which will ultimately print out the label. Next, the label with the new information is printed off by a separate printer. This physical label (which may be considered to be a "proof" copy) is then being sent back to the authorised person for checking and approving. It may be scanned in and electronically sent back for checking in some examples. If the printed label is incorrect, then this whole process needs to be repeated which can be inefficient in time, effort and use of printing materials (e.g. labels, ink). The method of FIG. 10 allows for a label preview 1102 which matches a physical label equivalent to be generated and checked via display on a display screen 1100 before the label 1104 is physically printed off, thereby improving the process of printing a label 1104 while ensuring the content of the label is correct and complete.

Such a method 1000 may be carried out by a controller such as a control module 700 as shown in FIG. 7. In such an example, the control module 700 comprises an input 706 configured to receive a label generation request indicating a food item to be labelled; a processor 702 configured to: retrieve a set of ingredients of the indicated food item in response to receipt of the label generation request; and generate a label preview to be displayed on a display screen, wherein the label preview includes the retrieved set of ingredients and is configured to appear the same as a printed version of the label; and an output 708 configured to provide a display signal to a display screen to cause the label preview to be displayed on a display screen. The control module 700 in some examples may be a virtual machine in the cloud, and/or may be a server remote from the label printer.

All disclosed features may be combined in any combination, except combinations where at least some of such features are mutually exclusive. Each feature disclosed in this specification may be replaced by alternative features serving the same, equivalent or similar purpose, unless expressly stated otherwise. The invention is not restricted to the details of any foregoing examples. The invention extends to any novel feature or novel combination of features disclosed herein, as defined by the appended claims.

The invention claimed is:

1. A control module for a labelling apparatus, comprising:
an input configured to receive a label generation request indicating a food item to be labelled;
an output configured to provide a print signal to a label printing device; and
a processor configured to:
identify a set of ingredients of the indicated food item in response to receipt of the label generation request;
verify that the identified set of ingredients of the food item is a most recent set of ingredients of the food item;
if the identified set of ingredients of the food item is verified as the most recent set of ingredients of the food item, output the print signal to cause the label printing device to print an information label indicating the set of ingredients of the food item; and
if the identified set of ingredients of the food item cannot be verified as the most recent set of ingredients of the food item, prevent provision of the print signal to the label printing device and provide an error indication to an error output device to cause an error alert to be output.

2. The control module of claim 1, wherein:
first ingredient data indicative of the set of ingredients of the indicated food item is stored at a local storage local to the control module;
second ingredient data indicative of a second set of ingredients of the indicated food item are stored at a remote server remote from the control module; and
the processor is configured to:
identify the most recent set of ingredients of the indicated food item from the first ingredient data and the second ingredient data; and
output the print signal to cause the label printing device to print the information label indicating the most recent set of ingredients of the food item identified from the first and second ingredient data.

3. The control module of claim 2, wherein the processor is configured to:
check if the first ingredient data is as recent as the second ingredient data;
if the first ingredient data is as recent as the second ingredient data, output the print signal to cause the label printing device to print the information label indicating the most recent set of ingredients of the food item based on the first ingredient data; and
if the first ingredient data is less recent than the second ingredient data, retrieve the second ingredient data from the remote server and output the print signal to cause the label printing device to print the information label indicating the most recent set of ingredients of the food item based on the retrieved second ingredient data.

4. The control module of claim 3, wherein checking if the first ingredient data is as recent as the second ingredient data comprises one or more of:
matching a timestamp of recordal of the first ingredient data with a timestamp of recordal of the second ingredient data;
matching a version identifier of the first ingredient data with a version identifier of the second ingredient data; and
matching each of the ingredients indicated by the first ingredient data with a corresponding ingredient indicated by the second ingredient data.

5. The control module of claim 2, wherein the processor is configured to:
attempt to establish communication between the control module and the remote server; and if communication between the control module and the remote server cannot be established, prevent provision of the print signal to the label printing device.

6. The control module of claim 2, wherein the processor is configured to:
following establishment of communication between the control module and the remote server, attempt to synchronise the first and second ingredient data; and
if the first and second ingredient data cannot be synchronised, prevent provision of the print signal to the label printing device.

7. The control module of claim 6, wherein the processor is configured to attempt to synchronise the first and second ingredient data one or more of:
periodically;
based on receipt of a synchronisation indication provided in dependence on a synchronisation user input; and
based on a change made to the second ingredient data.

8. The control module of claim 1, wherein the processor is configured to:
determine a printed size that the set of ingredients of the food item occupies once printed;
determine whether the printed size of the set of ingredients fits within an available printing area of a label to be printed; and
if the printed size of the set of ingredients does not fit within the available printing area of a label to be printed, prevent provision of the print signal to the label printing device.

9. The control module of claim 8, wherein the processor is configured to:
if the printed size of the set of ingredients does not fit within the available printing area of a label to be printed, provide an error indication to an error output device to cause an error alert to be output.

10. The control module of claim 1, wherein the processor is configured to:
receive, from a label printing device comprising a printhead having a plurality of print nozzles, a fault signal indicating that a predetermined number of print nozzles are not operational; and
prevent provision of the print signal to the label printing device in dependence on the fault signal.

11. The control module of claim 10, wherein the predetermined number of print nozzles that are not operational are neighbouring print nozzles configured to print within an area of a label of predetermined dimensions.

12. The control module of claim 1, wherein the control module is configured to output the print signal to control the label printing device to print the information label to indicate one or more of:
the current date of label printing;
the current time of label printing;
the date when the most recent set of ingredients was last updated;
the name of the food item; and
an identifier indicating the person who generated the label generation request.

13. The control module of claim 1, wherein the set of ingredients printed on the information label indicate one or more allergens.

14. The control module of claim 13, wherein the control module is configured to:
compare each of the ingredients in the set of ingredients with a list of allergens; and
if an ingredient of the set of ingredients matches an allergen in the list of allergens, generate the print signal to cause the ingredient identified as an allergen to be printed in a highlighted style by the label printing device.

15. A label printing apparatus comprising:
the control module of claim 1;
an input device configured to receive a user input and transmit the label generation request to the input of the control module in dependence on the received user input; and
a label printing device connected to the output of the control module, the label printing device configured to receive the print signal from the control module and print an information label in dependence on receipt of the print signal.

16. The label printing apparatus of claim 15, comprising an output indicator configured to provide an indication, to a user, in dependence on the control module preventing provision of the print signal to the label printing device.

17. The label printing apparatus of claim 15, wherein the label printing apparatus is one or more of: a weighing scale, a food preparation device, a printer, and a payment device.

18. A computer-implemented method for printing an information label for a food item, the method comprising:
receiving a label generation request indicating a food item to be labelled;
identifying a set of ingredients of the indicated food item in response to receipt of the label generation request;
verifying that the identified set of ingredients of the food item is a most recent set of ingredients of the food item;
if the identified set of ingredients of the food item is verified as the most recent set of ingredients of the food item, outputting the print signal to cause the label printing device to print an information label indicating the set of ingredients of the food item; and
if the identified set of ingredients of the food item cannot be verified as the most recent set of ingredients of the food item, preventing provision of the print signal to the label printing device and provide an error indication to an error output device to cause an error alert to be output.

19. A computer readable storage medium including instructions to perform a method comprising:
receiving a label generation request indicating a food item to be labelled;
identifying a set of ingredients of the indicated food item in response to receipt of the label generation request;
verifying that the identified set of ingredients of the food item is a most recent set of ingredients of the food item;
if the identified set of ingredients of the food item is verified as the most recent set of ingredients of the food item, outputting the print signal to cause the label printing device to print an information label indicating the set of ingredients of the food item; and
if the identified set of ingredients of the food item cannot be verified as the most recent set of ingredients of the food item, preventing provision of the print signal to the label printing device and provide an error indication to an error output device to cause an error alert to be output.

20. The control module of claim 1, wherein the error alert comprises at least one alert signal selected from the group consisting of a visual error alert signal, an audible error alert signal, and a haptic error alert signal.

* * * * *